Figure 1:
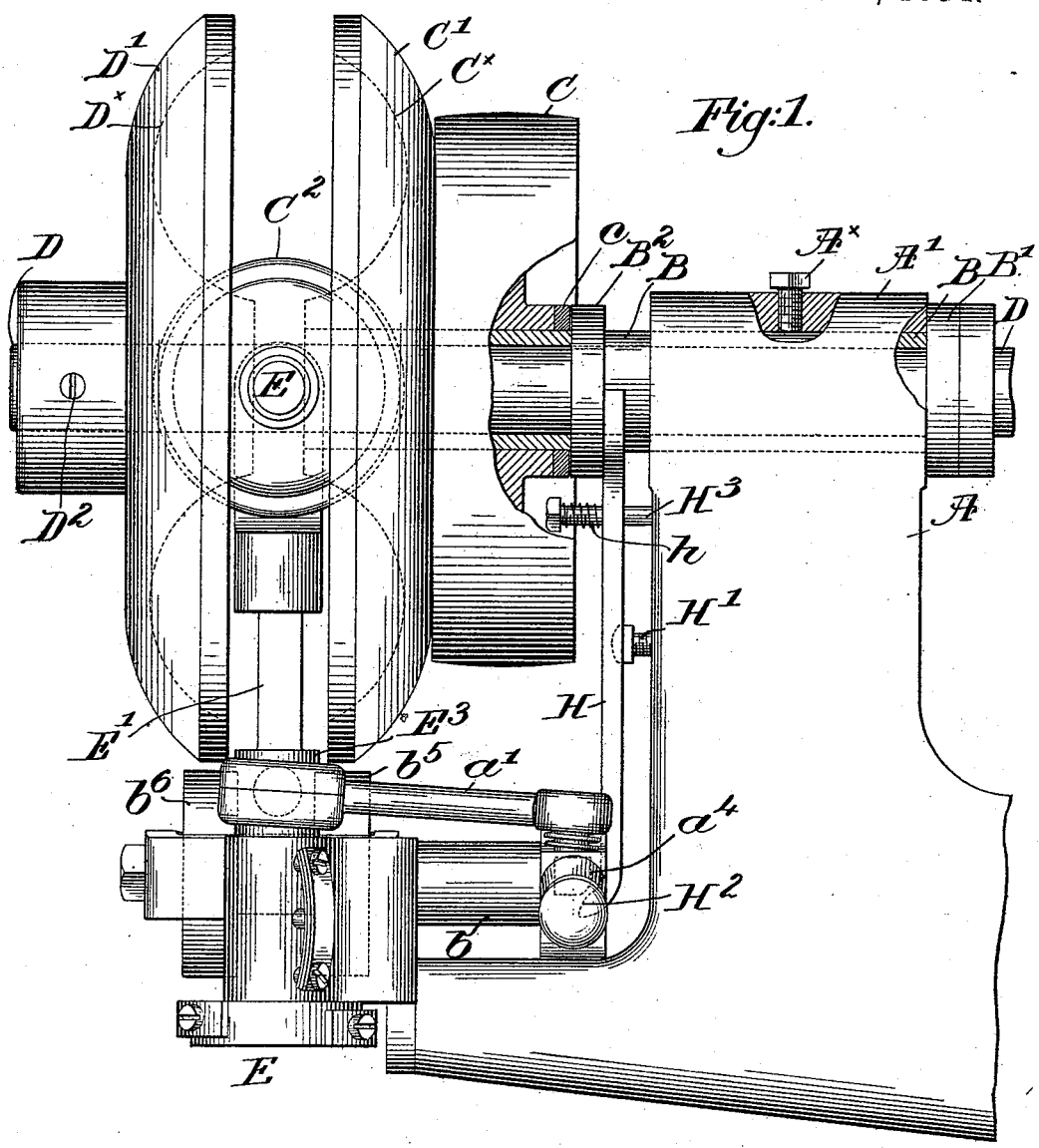

(No Model.) 2 Sheets—Sheet 1.

H. H. CUMMINGS.
SPEED CHANGING AND REVERSING MECHANISM.

No. 529,714. Patented Nov. 27, 1894.

Witnesses.
Fred S. Greenleaf.
Thomas J. Drummond.

Inventor.
Henry H. Cummings
by Crosby & Gregory, attys.

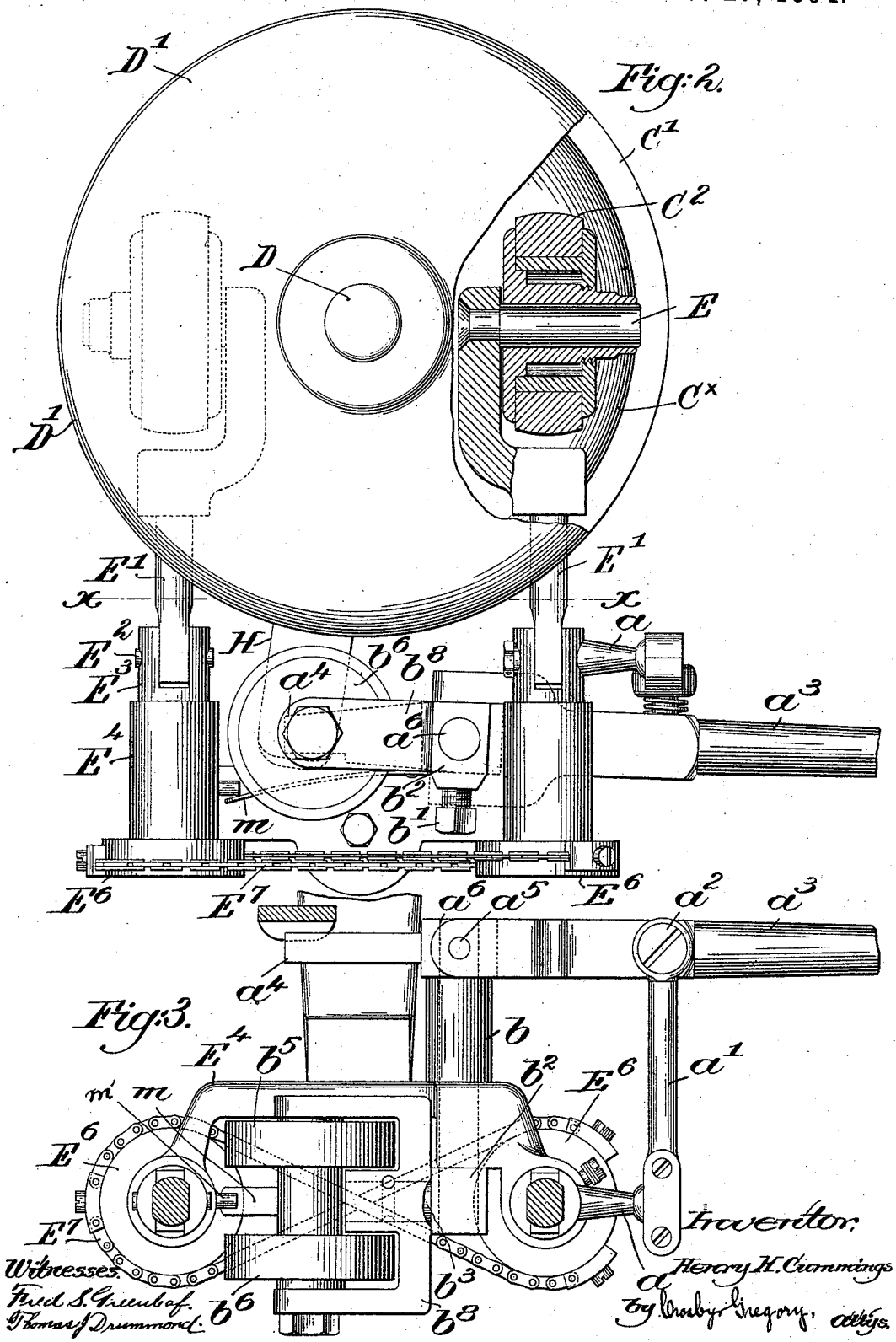

UNITED STATES PATENT OFFICE.

HENRY H. CUMMINGS, OF MALDEN, MASSACHUSETTS.

SPEED-CHANGING AND REVERSING MECHANISM.

SPECIFICATION forming part of Letters Patent No. 529,714, dated November 27, 1894.

Application filed March 9, 1894. Serial No. 502,980. (No model.)

*To all whom it may concern:*

Be it known that I, HENRY H. CUMMINGS, of Malden, county of Middlesex, State of Massachusetts, have invented an Improvement in Speed-Changing and Reversing Mechanism, of which the following description, in connection with the accompanying drawings, is a specification, like letters on the drawings representing like parts.

This invention has for its object the production of an improved speed-changing and reversing mechanism adapted to be applied to screw machines, lathes, drills, planers, &c., wherein it is desired to drive a shaft faster or slower according to the work to be done, and also to reverse the rotation of the shaft.

My improved mechanism contains a series of friction wheels or devices rather than toothed gearing.

Figure 1 in side elevation, partially broken out, represents my improved speed-changing and reversing mechanism. Fig. 2 is a left-hand end view of the devices shown in Fig. 1, the fast pulley being broken out at one side to show the loose pulley beyond it and also the interposed friction wheel, the dotted lines in said figure showing the other friction wheel. Fig. 3 is a section below the dotted line $x$, Fig. 2.

Referring to the drawings, let A represent part of the frame-work of a machine, a lathe, screw machine, drill, planer, or whatever form of machine to which my invention is to be applied. The frame-work has a suitable bearing $A'$ in which is clamped by a suitable screw $A^\times$ a sleeve B, represented partially in section and partially in dotted lines. The sleeve referred to has at one end a collar $B'$ which rests preferably against the bearing $A'$. The sleeve is surrounded loosely by a sliding pressure collar $B^2$.

The sleeve B has loosely mounted upon it the hub of a pulley C, a raw-hide or other friction or anti-friction washer $c$ being preferably interposed between said sliding collar $B^2$ and one end of the hub of the pulley C. The pulley C has connected to or forming part of it a friction pulley $C'$, it having at its face a concaved annular groove $C^\times$, the shape of which is indicated by dotted lines in Fig. 1, said groove being adapted to be entered by one or more shiftable friction wheels $C^2$, shown partly by full and dotted lines in Fig. 1, said wheels having preferably non-metallic peripheries or tires, as best represented in Fig. 2.

The sleeve B receives through it and forms a bearing for the shaft D which is or may be the main or power shaft of the machine to be driven by my speed-changing or reversing mechanism. The shaft D is extended through said sleeve and has fixed upon it by a set screw $D^2$ or otherwise, the hub of a friction pulley $D'$. The pulley $D'$ also has a concaved annular groove $D^\times$, the outline of which is shown by dotted lines in Fig. 1.

The wheels $C^2$ are adapted to rotate freely about studs E carried by arms $E'$; and these arms $E'$ are pivoted at $E^2$ upon rockers $E^3$ which rockers are supported in bearings $E^4$ attached to or forming part of the machine frame. Each of said rockers has attached to it, as herein shown, at its lower end, a disk $E^6$, and the said disks are operatively connected together by a belt $E^7$ preferably made in the form of a chain, so that when one of said rockers is partially rotated it will turn the other of said rockers in unison with it, but in an opposite direction, and at such times the friction wheels will also be turned, so that they will be moved so that their peripheries will travel toward or from the center line of shaft D, and the said wheels, according to the more or less angular position of the studs E upon which they rotate, will vary more or less the difference in speed between the driving and the driven wheel, or between the loose pulley $C'$ and the fast pulley $D'$. As the periphery of the friction wheel $C^2$ travels toward the center of rotation of the loose pulley $C'$, the speed of the shaft D will be decreased, and vice versa. It will, therefore, be understood that the shaft D will be rotated at a slower or faster speed with relation to the speed of rotation of the pulley $C'$, according to the particular positions of the friction wheels $C^2$ within the semicircular grooves of the pulleys $C'$, $D'$; or in other words, the change of position of the said wheels $C^2$ as to their points of contact with the pulleys $C'$, $D'$, insures the rotation of the shaft D at a faster or slower speed, as may be desired.

To cause the continuously rotating pulley

C', which may be driven from a countershaft in any usual way, to rotate the pulley D' and the shaft D, the said pulley C' must be pressed against the peripheries of the intermediate friction wheels $C^2$, and this is effected, in this present instance of my invention, by means of a lever H, the upper end of which contacts with one side of the sliding collar $B^2$, said lever resting upon an adjustable fulcrum or abutment H' and having at its lower end, preferably, a cam projection $H^2$. See Fig. 1.

I have herein shown the lever H as surrounding a pin $H^3$ having a spring $h$ which normally acts upon the lever to move its upper end away from the sliding collar $B^2$.

One of the rockers $E^3$, normally that one at the right in Figs. 2 and 3, is shown as provided with an arm $a$ to which is connected, preferably by a ball and socket joint, a link $a'$ secured by a suitable ball-headed stud screw $a^2$, to a compound lever $a^3$, $a^4$, or a lever so made and mounted that it may be moved not only horizontally, but also up and down, it turning horizontally about a stud $a^5$, see Fig. 3, and up and down about the center of shaft $a^6$, shown by full lines in Fig. 2, and by dotted lines in Fig. 3. The inner portion $a^4$ of the compound lever referred to co-operates with the lower end of the lever H.

The shaft $a^6$ is extended through a bearing $b$ rigid with relation to the frame-work, and at its outer end it has fast upon it by a set screw $b'$ a block $b^2$, provided with a horizontally extended projection $b^3$, shown partly by full and partly by dotted lines in Fig. 3. This projection $b^3$ constitutes a pivot bearing for a yoke $b^8$ having a suitable stud bolt upon which is mounted a pair of reversing wheels $b^5$, $b^6$, preferably covered with leather or india-rubber, said wheels being adapted to contact with the peripheries of the fast and loose pulleys D', C', when it is desired to reverse said pulleys, the wheels $b^5$, $b^6$, being connected to the same hub, so that when the loose pulley C' by contact with the reversing wheel $b^5$ rotates it, it will cause the reversing wheel $b^6$, in contact with the fast pulley D', to rotate in the same direction as the loose pulley C', the direction, however, being the reverse of that which would be given to the fast pulley D' by the friction pulley $C^2$.

The spring $m$ connected to the yoke $b^8$ co-operates with the stop $m'$ and serves to counterbalance the weight of the long arm of the compound lever $a^3$ and aids in keeping the reversing wheels in a normal position and out of contact with the pulleys D', C'.

When the lever $a^3$ is in the position shown in the drawings, its inner end $a^4$ will be elevated somewhat above the cam surface $H^2$ of the lever H, and consequently said lever H will rest gently against the sliding collar $B^2$, and the shaft D will be at rest, the pulley C being, however, let it be supposed in rotation.

To start the shaft D in its right direction of rotation to do work, the operator will elevate the outer end of the lever $a^3$, and in so doing cause the inner end $a^4$ thereof to act upon the cam portion of the lever H and force the collar $B^2$ against the loose pulley C and cause the pulley C' to be forced snugly against the friction wheel $C^2$, and the shaft D will be rotated at a faster or slower speed according to the extent of motion which the operator shall give to the lever $a^3$ about its pivot $a^5$, as the movement of said lever in that direction will cause the peripheries of the friction pulleys to be moved in the grooves of the pulleys C', D', as hereinbefore stated.

To reverse the rotation of the shaft D, the operator will simply push the outer end of the lever $a^3$ down far enough to raise the reversing wheels from their positions shown in Figs. 1 and 2, to contact with the pulleys C', D', such movement of the lever $a^3$ relieving the pressure of the lever H on the sliding collar $B^2$, and leaving the constantly rotating pulley C as the driver through the reversing wheels $b^5$, $b^6$, for the pulley D'.

The sole purpose of the sliding collar $B^2$ is to obviate friction between the lever H and the hub of the constantly rotating pulley C, and the fibrous or india-rubber washer $c$ is intended to reduce this friction, and instead of said washer I might use any other usual or suitable contrivance for reducing friction and my invention would not be departed from, even if the lever H itself bore directly against the hub of the pulley C.

Believing myself to be the first to combine with a fast and loose pulley and intermediate friction wheels to change the relative speed of said pulleys devices for reversing the movement of said pulleys, and consequently the main or other shaft of the machine to which they are applied, I do not desire to limit this invention to the exact form of frictional reversing device shown.

I have shown two wheels the peripheries of which bear directly against the fast and loose pulleys when the shaft D is to be reversed, but this reversing device may be differently shaped within the skill of a mechanic and without the exercise of invention, as for instance, belts bearing against the pulleys C' and D' might be used instead of the particular wheels shown, and in the claims herein drawn by the term "reversing device" I intend to include not only the particular wheels shown but any usual or well known equivalent or substitute.

I have herein shown fast and loose pulleys adapted to be rotated frictionally by a friction wheel, mounted between the faces of said pulleys on a rocking support having fixed bearings, said pulleys being relatively movable laterally, and in connection therewith I have shown means to move said pulleys relatively to bring them into engagement with opposite portions of the friction wheel, to rotate the loose pulley oppositely to the continuously rotated pulley; a device to turn the rocking support of the friction wheel to attain the desired relative speed of the pulleys, and a common actuator to operate the support turning device, or the means for relatively moving the pulleys, but I do not herein broadly claim said mechanism, as the same is broadly claimed in my application, Serial No. 514,906, filed June 18, 1894.

Having described my invention, what I claim, and desire to secure by Letters Patent, is—

1. The combination of a shaft to be rotated, a pulley fixed thereon and having a concaved groove at one side; a friction pulley loose with relation to said shaft and having a concaved face adjacent to the grooved face of the fixed pulley, and adapted to be rotated continuously; a friction wheel interposed between said friction pulleys; a rocking support for said friction wheel, whereby diametrically opposite points of the periphery of said friction wheel may be made to contact with portions of the said grooved pulleys simultaneously at different distances from their centers of rotation; a device to force the grooved pulley loose with relation to said shaft against said friction wheel; and a lever adapted to act on said device, and connections between said lever and said rocking support for the said friction wheel, whereby by movement of one and the same lever the grooved pulley loose with relation to said shaft may be forced against the said friction wheel, and at the same time the said rocker be turned to gain the desired speed for the shaft, substantially as described.

2. The combination of a shaft, a pulley fixed thereon and having a concaved groove in one face; a pulley loose with relation to said shaft and adapted to be rotated continuously, said loose pulley having a concaved groove in its face adjacent the said fixed pulley; a friction wheel interposed between said grooved pulleys and means to pinch the said friction wheel between the said pulleys to cause the said friction wheel to be rotated by one of said pulleys, and thereby to rotate the other of said pulleys, and also to render the said friction wheel inactive as the driver, frictional reversing devices and means to move them into and out of engagement with the said pulleys to effect the reversal of movement of said shaft when the interposed friction wheel is inactive as the driver for the said shaft, substantially as described.

3. The shaft D, the pulley D' fixed thereon and grooved at its face; the pulley C' loose with relation to said shaft and also grooved at its face; a friction wheel located between the grooved faces of said pulleys and adapted to be pinched between them to enable one pulley to rotate the other and its connected shaft; a rocker to support said friction wheel; a device to force the grooved pulley loose with relation to said shaft toward and against the periphery of the said friction wheel; a lever to act against said device; a link connecting said lever and said rocker; and a yoke having reversing wheels and also under the control of the same lever, whereby by one and the same lever, according to its direction of movement, the loose pulley may be made to drive the fast pulley at any desired speed, or to reverse the said shaft according to the desire of the operator, substantially as described.

In testimony whereof I have signed my name to this specification in the presence of two subscribing witnesses.

HENRY H. CUMMINGS.

Witnesses:
GEO. W. GREGORY,
LAURA MANIX.